United States Patent [19]

Su

[11] Patent Number: 5,454,242

[45] Date of Patent: Oct. 3, 1995

[54] LOCKING DEVICE FOR A STEERING WHEEL OF A CAR

[76] Inventor: Wen-Chyun Su, No. 5, Alley 3, Lane 88, Wuchuan Rd., Shenkang Hsiang, Taichung Hsien, Taiwan

[21] Appl. No.: 224,029

[22] Filed: Apr. 7, 1994

[51] Int. Cl.⁶ .................................................. B60R 25/02
[52] U.S. Cl. .............................. 70/209; 70/226; 70/211; 70/237
[58] Field of Search ............................. 70/209, 211, 226, 70/237

[56] References Cited

U.S. PATENT DOCUMENTS

| | | | |
|---|---|---|---|
| 3,828,593 | 8/1974 | Bolton | 70/209 |
| 4,829,797 | 5/1989 | Wu | 70/211 |
| 5,014,529 | 5/1991 | Wu | 70/209 |
| 5,022,246 | 6/1991 | Wang | 70/209 |
| 5,031,428 | 7/1991 | Jan et al. | 70/209 |
| 5,097,685 | 3/1992 | Lien | 70/211 |
| 5,113,672 | 5/1992 | Wang | 70/209 |
| 5,168,732 | 12/1992 | Chen et al. | 70/209 |
| 5,277,042 | 1/1994 | Tobias | 70/209 |
| 5,347,836 | 9/1994 | Chen | 70/226 |
| 5,353,615 | 11/1994 | Chen | 70/209 |

*Primary Examiner*—Peter M. Cuomo
*Assistant Examiner*—Tuyet Pham
*Attorney, Agent, or Firm*—Hedman, Gibson & Costigan

[57] ABSTRACT

A locking device for a steering wheel of a car includes a main body and a locking assembly. The main body has first and second ends, the second end thereof having an extending bar disposed thereon, a channel for receiving a rim of the steering wheel being defined transversely in the main body and communicating with a passage, both of which being accessible via an under side of the main body. The locking assembly is disposed to the main body and includes a clamping element having a lock disposed therein for being secured within the main body so as to restrain the rim of the steering wheel from disengaging from the channel.

6 Claims, 5 Drawing Sheets

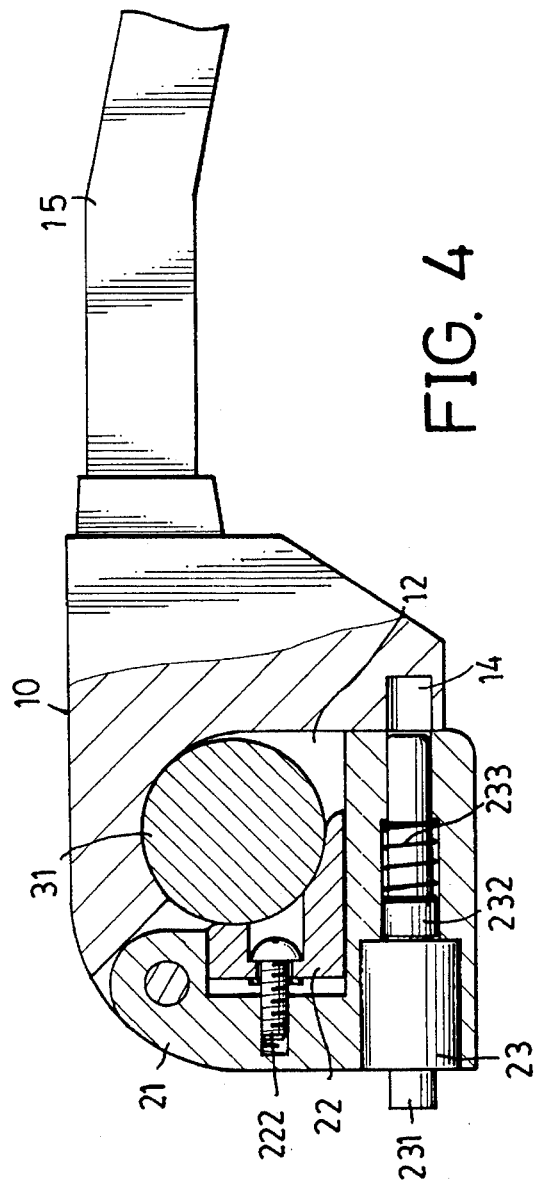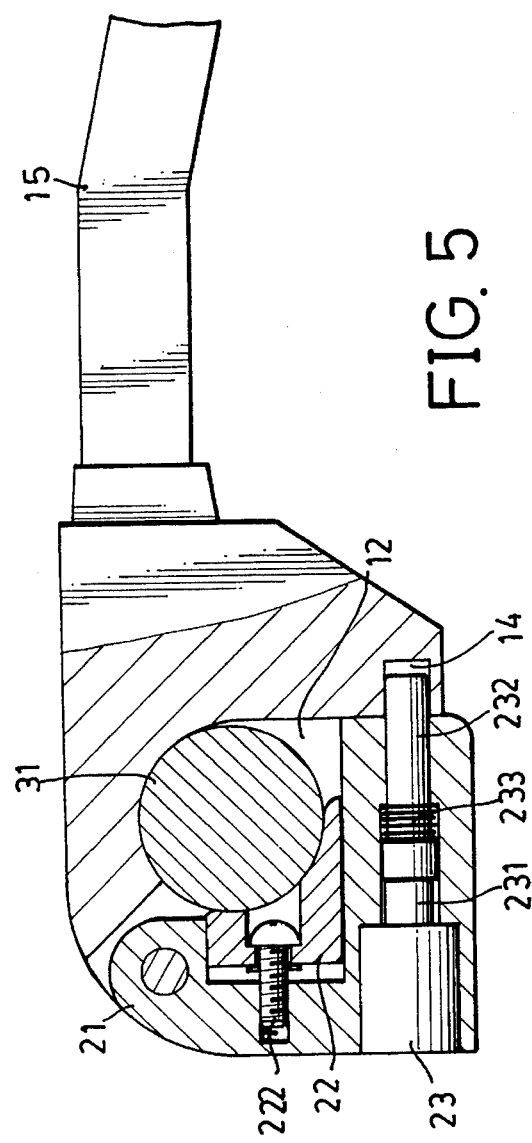

LOCKING DEVICE FOR A STEERING WHEEL OF A CAR

BACKGROUND OF THE INVENTION

The present invention relates to a locking device, and more particularly, to a locking device for a steering wheel of a car, which engages to a rim of the steering wheel and has an extending bar being placed on an upper surface of a dashboard.

There are various kinds of locking device utilized in cars for the purpose of preventing from theft thereof, one of them has a shaft with two ends and both of which have a hook disposed thereon, one hook is hooked to a accelerating pedal or a brake pedal, and the other is hooked to a rim of a steering wheel so as to prevent the steering wheel from being operated and the pedals from being depressed. However, a configuration of the steering wheel could be deformed under a pulling force by a hook after a period of time in locking situation, and the pedals could be damaged for the same reason.

The present invention intends to provide a locking device which engages to the rim of the steering wheel with one end thereof and the other end thereof being an extending bar which is placed on the dashboard so as to mitigate and/or obviate the above mentioned problems.

SUMMARY OF THE INVENTION

The present invention provides a locking device for a steering wheel of a car, which includes a main body, an extending bar and a locking assembly. The main body has first and second ends, the second end having the extending bar disposed thereof, a channel for receiving a rim of the steering wheel being defined transversely in the main body and communicating with a passage, both of which being accessible via an under side of the main body. The locking assembly is disposed to the main body and includes a clamping element having a lock disposed therein for being secured within the main body so as to restrain the rim of the steering wheel from disengaging from the channel.

It is an object of the present invention to provide an easily operated locking device which is shorter than a conventional one.

Other objects, advantages, and novel features of the invention will become more apparent from the following detailed description when taken in conjunction with the accompanying drawings.

BRIEF DESCRIPTION OF THE DRAWINGS

FIG. 4 is a side elevational view, partly in section, wherein the clampling element is received in a passage of the main body;

FIG. 5 is a side elevational view, partly in section, wherein the clamping element is locked in the main body by pushing a pushing rod disposed in a lock disposed therein;

DETAILED DESCRIPTION OF THE PREFERRED EMBODIMENTS

Figure 1:
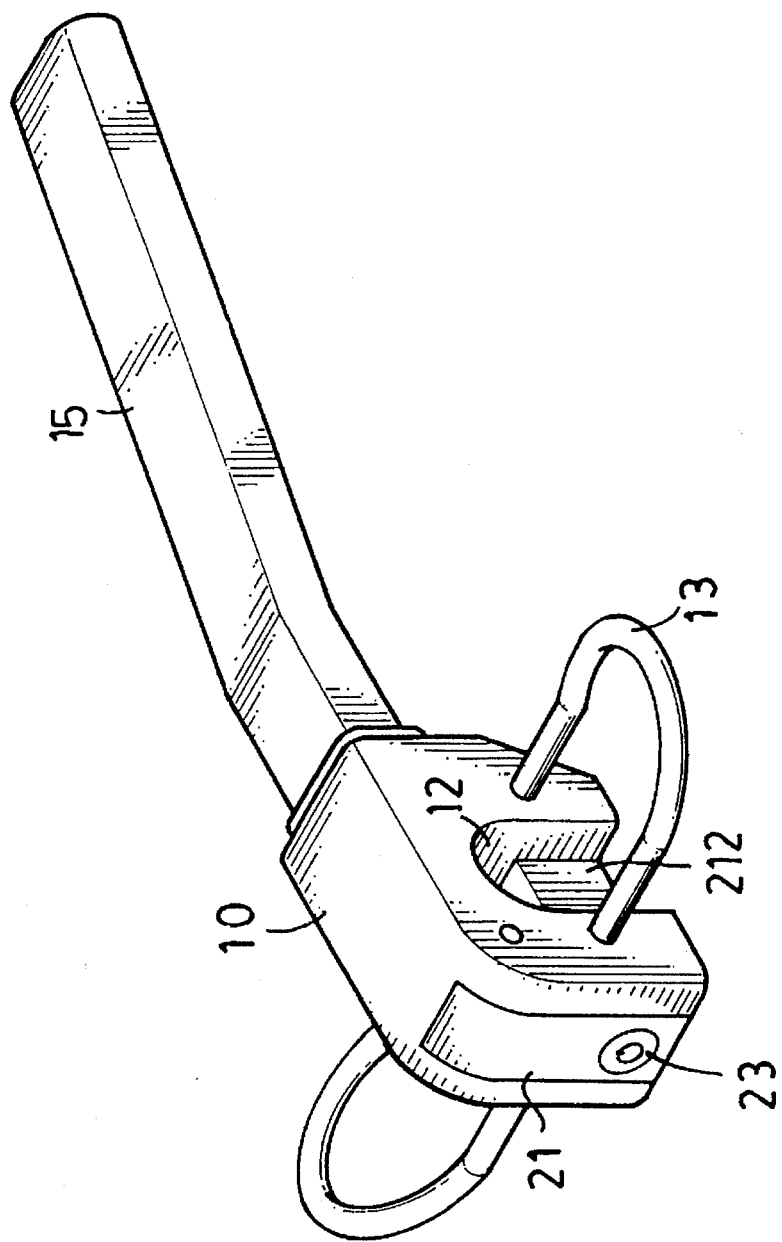
FIG. 1 is a perspective view of a locking device in accordance with the present invention.
Figure 2:
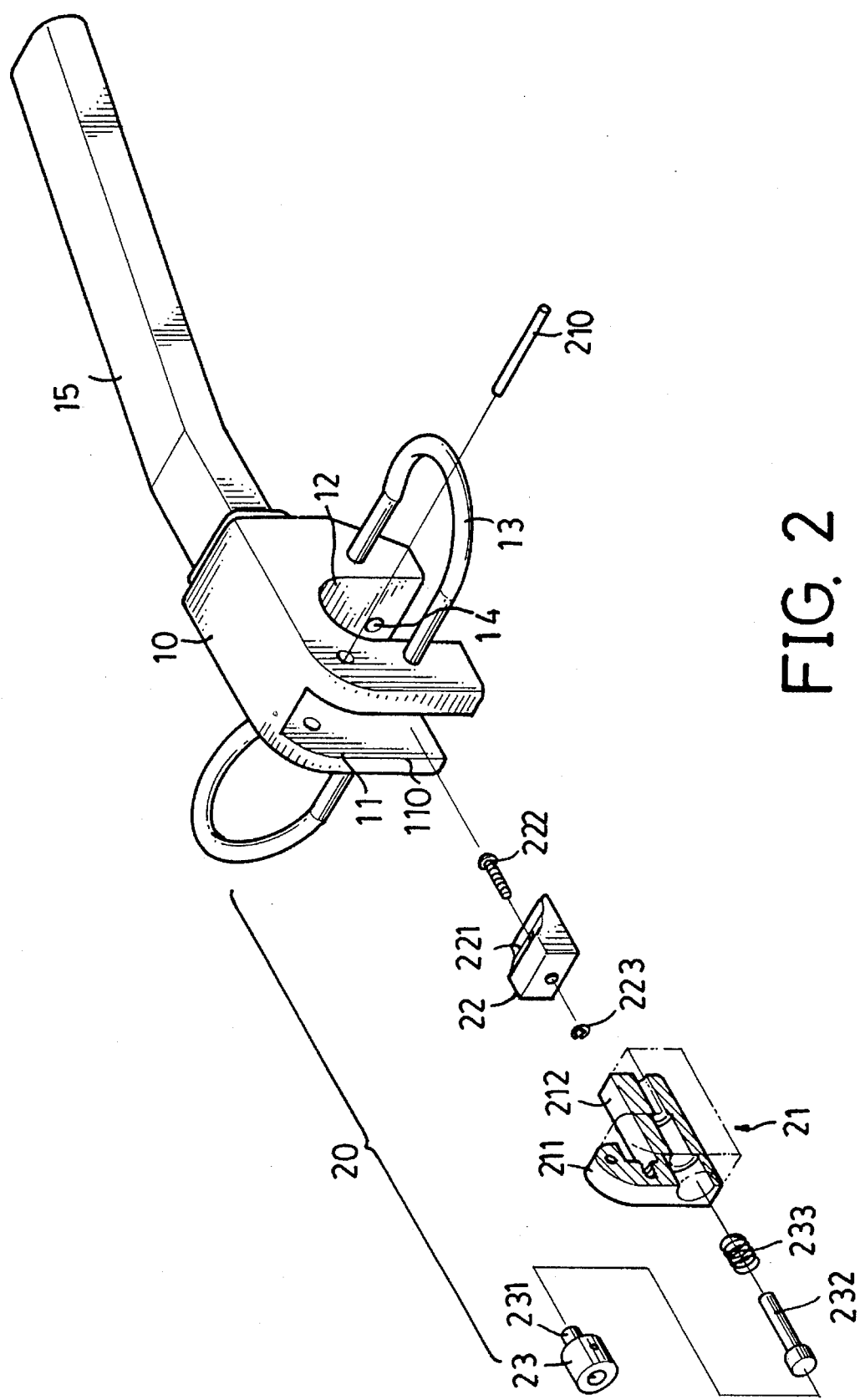
FIG. 2 is an exploded view of the locking device in accordance with the present invention.
Figure 3:
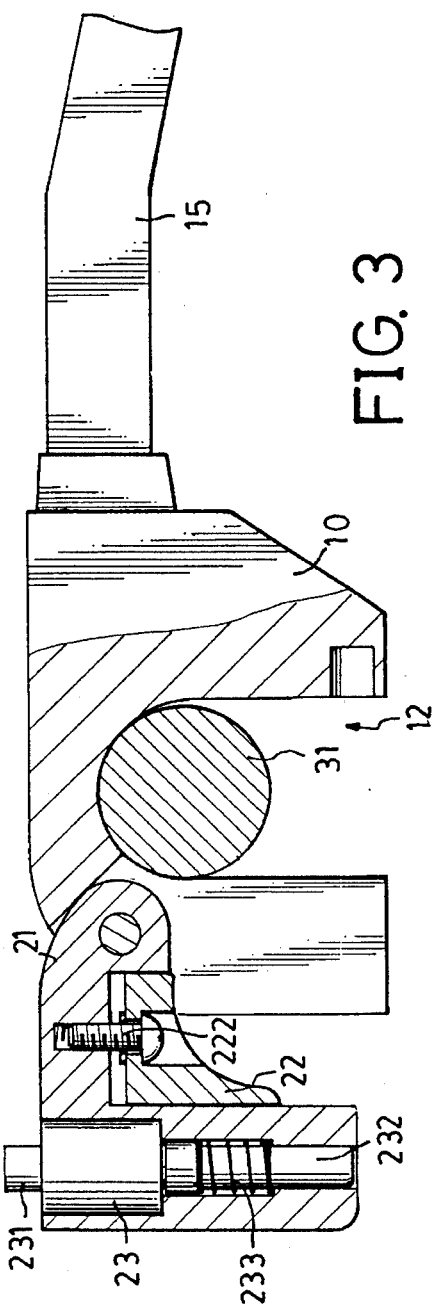
FIG. 3 is a side elevational view, partly in section, of the locking device wherein a clamping element is pivotally, removed from a main body and a rim of a steering wheel is disposed in a channel of the main body in accordance with the present invention.

Referring to the drawings and initially to FIGS. 1 and 2, a locking device in accordance with the present invention generally includes a main body 10, an extending bar 15 and a locking assembly 20. The main body 10 has first and second ends, a passage 11 being defined by two walls 110 formed in the first end of the main body 10, a channel 12 being defined transversely in the main body 10 and communicating with the passage 11, thereby, both the passage 11 and the channel 12 are accessible via an under side of the main body 10. Two side elements 13, each of which is U-shaped, are disposed on each side of the main body 10. The side element 13 has a free end which is angled slightly upward. The extending bar 15 is disposed on the second end of the main body 10.

The locking assembly 20 comprises a clamping element 21, an adjustable block 22 and a lock 23. The clamping element 21 is an L-shaped element and has a vertical portion 211 having a threaded recess and a horizontal portion 212 having a through hole defined therein. The clamping element 21 is pivotally engaged to the vertical portion 211 and the side walls 110 in which a hole is defined therethrough which a pin 210 extends, thereby a distal end of the horizontal portion 212 is disposed within the channel 12. The lock 23 and a locking pin 232 with a spring 233 are disposed in the through hole of the horizontal part 212 of the clamping element 21 in sequence. The lock 23 has a pushing rod 231 having first and second ends, and which is slidably disposed therein. The second end of the pushing rod 231 extends outwardly from an end of the lock 23 when the lock is locked by pushing the first end of the pushing rod 231 extending from the other end of the lock when unlocked. Therefore, when locking the lock 23, the second end of the pushing rod 231 is pushed outwardly and that pushes the locking pin 232 and the spring 233 to let the locking pin 232 enter in a recess 14 defined in a periphery of passage 11 of the main body 10 to secure the clamping element 21 in place.

Please refer further to FIGS. 3 through 5, 7 and 8, when using the lock device in accordance with the present invention, the clamping element 21 is rotated out from the passage 11 first and the main body 10 is mounted on a rim 31 of a steering wheel 30 which is then received in the channel 12. The rim 31 of the steering wheel 30 is then engaged with the side elements 13 and the extending bar 15 is placed on an upper surface of a dashboard 40 of a car to prevent the steering wheel 30 from rotating. When unlocking the lock 23, the pushing rod 231 is actuated to be withdrawn into the lock 23 and the locking pin 232 is biased out from the recess 14 by the spring 233, the clamping element 21 is then swung outwardly to re-open the channel 12 and thus, the main body 10 can be removed from the rim 31 of the steering wheel 30.

Figure 6:
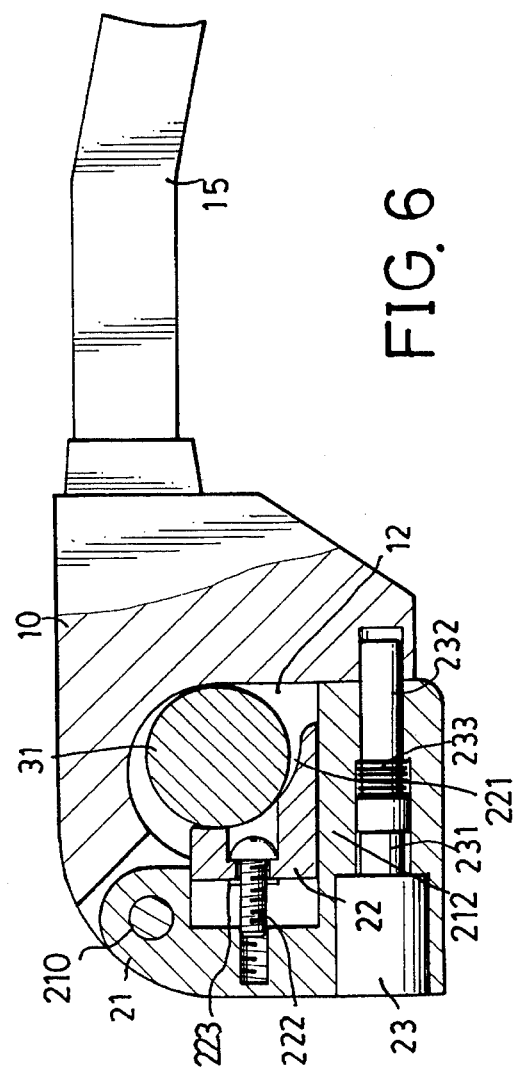
FIG. 6 is a side elevational view, partly in section, wherein an adjustable block is adjusted to restrain a smaller rim of a steering wheel received in the main body.
Figure 7:
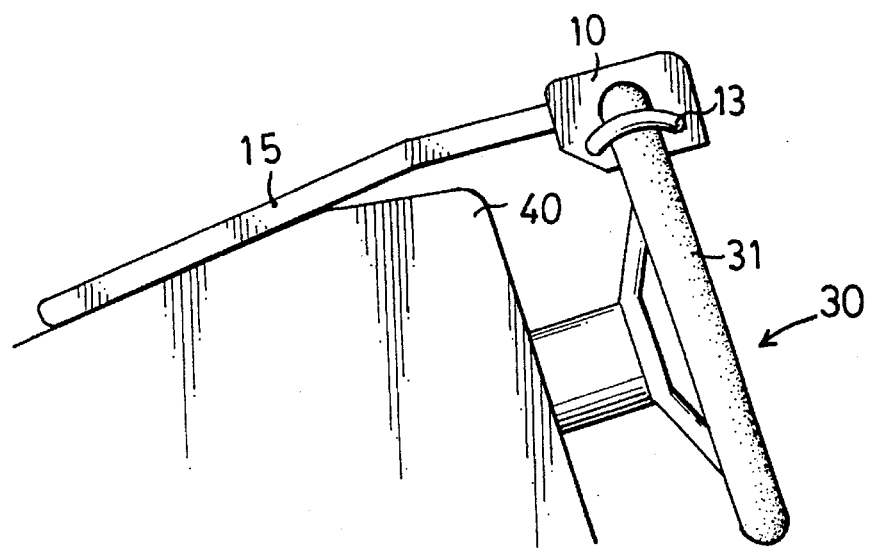
FIG. 7 is a side elevational view of the locking device in accordance with the present invention showing an extending bar placed on an upper surface of a dashboard of a car.
Figure 8:
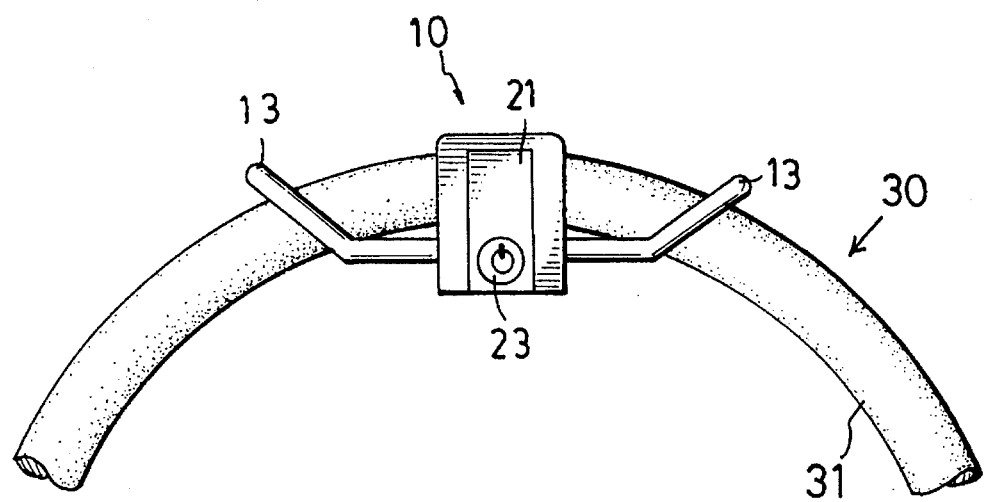
FIG. 8 is a front elevational view of the locking device in accordance with the present invention showing the rim of the steering wheel engaged to two side elements of the main body.

Referring now to FIG. 6, an adjustable block 22 is an

L-shaped element having a curved inclined surface 221 and is disposed on an abutment of the vertical and horizontal portions 211, 212 of the clamping element 21. An adjusting bolt 222 is inserted through a hole of the adjustable block 22 and is threadedly engaged in the threaded recess of the vertical portion 211 of the clamping element 21. A C-clip 223 is attached to the adjusting bolt 222 abutting the block 22 to secure the bolt rotatably therein, i.e., there is no relative motion occurring between the adjusting bolt 222 and the adjustable block 22. When a steering wheel 30 with smaller rim 31 is received in the passage 11, the adjustable block 22 can be moved away from the vertical portion 211 of the clamping element 21 by rotating the adjusting bolt counter-clockwise in order to set a smaller gap within the channel 12 and to restrain the smaller rim 31 securely.

Therefore, the locking device of the present invention has a very short length which provides an efficient usage of space in the car.

Although the invention has been explained in relation to its preferred embodiment, it is to be understood that many other possible modifications and variations can be made without departing from the spirit and scope of the invention as hereinafter claimed.

I claim:

1. A locking device for a steering wheel of a car, and comprising:

a main body having first and second ends, said second end having an extending bar disposed thereon, a channel for receiving a rim of said steering wheel being defined transversely in said main body and communicating with a passage, said channel and said passage being accessible via an under side of said main body;

a locking assembly disposed in said main body and comprising a clamping element, said clamping element having an adjustable block disposed thereon by extending a bolt through said block, said bolt being rotatably engaged to said block by clamping a C-clip thereon and threading in said clamping element, a lock disposed in said clamping element for being secured within said main body so as to restrain said rim of said steering wheel from disengaging from said channel.

2. The locking device as claimed in claim 1 wherein said clamping element is an L-shaped element and is pivotally engaged to said main body at an upper end thereof such that said rim of said steering wheel is enclosed by said clamping element and an inner side defining said channel.

3. The locking device as claimed in claim 2 wherein said clamping element is pivotally engaged to said main body within a passage defined in said first end thereof at an upper end of said clamping element such that said rim of said steering wheel is enclosed by said clamping element and the inner side of said channel.

4. The locking device as claimed in claim 1 wherein said main body has a recess defined in the inner side of said channel and is correspondent to said passage, said lock having a locking pin which is inserted into said recess when said lock is locked.

5. The locking device as claimed in claim 1 wherein said main body has two side elements each of which extends from a side of said main body for pressing against said rim of said steering wheel.

6. The locking device as claimed in claim 5 wherein said side element is a U-shaped element.

* * * * *